United States Patent [19]

Worschech et al.

[11] Patent Number: 4,591,452

[45] Date of Patent: May 27, 1986

[54] SOLID MULTICOMPONENT MIXTURES OF STABILIZERS AND LUBRICANTS FOR HALOGENATED POLYMERS AND THE PREPARATION THEREOF

[75] Inventors: Kurt Worschech; Peter Wedl, both of Loxstedt; Frido Löffelholz, Bermerhaven, all of Fed. Rep. of Germany

[73] Assignee: Neynaber Chemie GmbH, Loxstedt, Fed. Rep. of Germany

[21] Appl. No.: 481,846

[22] Filed: Apr. 1, 1983

[30] Foreign Application Priority Data

Jul. 2, 1982 [DE] Fed. Rep. of Germany ....... 3224717

[51] Int. Cl.$^4$ .................. C08K 5/56; C08K 13/02; C09K 15/06
[52] U.S. Cl. ................. 252/400 A; 252/400 R; 252/383; 252/384; 523/351; 524/904
[58] Field of Search .......... 252/400.2, 400.51, 400.61, 252/383, 384, 400.1, 400.24, 400.52, 400.53; 428/503; 427/214, 212, 220; 524/904; 523/351

[56] References Cited

U.S. PATENT DOCUMENTS

| | | | |
|---|---|---|---|
| 3,072,586 | 1/1963 | Pitrot et al. | 252/400.1 |
| 3,461,081 | 8/1969 | Sugahara et al. | 252/400.51 |
| 3,519,571 | 7/1970 | Szczepanek et al. | 252/400.51 |
| 3,668,144 | 6/1972 | Pearson | 252/400.51 |
| 3,779,962 | 12/1973 | Koenen et al. | 252/383 X |
| 3,951,849 | 4/1976 | Vickery et al. | 252/314 |
| 3,975,326 | 8/1976 | de Vrieze | 523/351 |
| 4,025,690 | 5/1977 | Nanni | 523/351 X |
| 4,116,908 | 9/1978 | Emery | 523/351 |
| 4,238,384 | 12/1980 | Blumberg et al. | 523/351 |
| 4,283,310 | 8/1981 | James et al. | 252/383 X |
| 4,283,315 | 8/1981 | James et al. | 252/383 X |
| 4,368,139 | 1/1983 | Pollock et al. | 252/400.51 X |
| 4,371,656 | 2/1983 | Kashiwase et al. | 252/400.51 |

FOREIGN PATENT DOCUMENTS

| | | | |
|---|---|---|---|
| 621848 | 8/1962 | Belgium | 252/400.24 |
| 1136935 | 12/1968 | United Kingdom . | |

OTHER PUBLICATIONS

*Encyclopedia of Polymer Science and Technology*, vol. 12, John Wiley, 1970, pp. 749–752; vol. 14, 1971, pp. 419–423.

*Primary Examiner*—Edward A. Miller
*Assistant Examiner*—Matthew A. Thexton
*Attorney, Agent, or Firm*—Hammond & Littell, Weissenberger & Dippert

[57] ABSTRACT

This invention relates to a process for preparing free-flowing stabilizer and lubricant compositions for halogenated polymers comprising combining two or more lubricant and stabilizer components to form a mixture of powdered compounds, which mixture consists at least partly of organic compounds and lubricants and stabilizers solid at room temperature, and intensely fluid-mixing said mixture together with from about 0.2 to 5 parts by weight, per 100 parts by weight of the mixture, of an organic lubricant for halogenated polymers that is liquid at room temperature, the process being carried out so that melting or softening of the powdered compounds does not occur. The organic lubricant liquid at room temperature is selected from the group consisting of the 2-ethylhexyl, isononyl, isodecyl, isotridecyl, and isooctadecyl esters of 2-ethylhexanoic, isononanoic, isodecanoic, isotridecanoic, or isooctadecanoic acid or of a fatty acid having from 16 to 18 carbon atoms or a mixture thereof, such as stearic acid.

37 Claims, No Drawings

SOLID MULTICOMPONENT MIXTURES OF STABILIZERS AND LUBRICANTS FOR HALOGENATED POLYMERS AND THE PREPARATION THEREOF

FIELD OF THE INVENTION

This invention is directed to stabilizers and lubricants for halogenated polymers. More particularly, this invention is directed to solid multicomponent mixtures of stabilizers and/or lubricants for halogenated polymers and the preparation thereof.

BACKGROUND OF THE INVENTION

The addition of balanced mixtures of various types of stabilizers and/or lubricants to a polymer prior to molding is a well-known step for the stabilization of halogenated polymer compounds such as polyvinyl chloride (PVC) against the effects of light and heat. The processing of hard PVC, for example, requires the addition of a multicomponent mixture for stabilization and also for improvement of the lubrication behavior, which mixture consists of components that can be grouped in the following three or four classes: (1) lubricating stabilizers, (2) stabilizers with non-lubricating effect, (3) pure lubricants, as well as, optionally, (4) additives.

Components of the first-mentioned class combine a stabilizing effect with an improvement of the lubrication action. Examples of these include the well-known metallic soaps of higher carboxylic acids, such as fatty acid soaps of calcium, barium, cadmium, zinc, and/or lead. Especially important for practical applications are calcium and/or lead stearate. Non-lubricating stabilizers (2) generally comprise salts of organic acids and/or, especially, inorganic acids, mainly metallic sulfates, metallic phosphites, and/or metallic carbonates. Basic lead salts such as tribasic lead sulfate or dibasic lead phosphite are especially important among these. Useful lubricants (3) include numerous, purely organic nonmetallic compounds which may be fatty acids, fatty acid esters, paraffins, wax esters, fatty alcohols, and/or partial esters of polyols or polycarboxylic acids. Finally, other conventional additives (4) include pigments, fillers, so-called modifiers, for example, resins that improve the toughness, and similar substances.

Dependent upon their chemical constitution, many members of these classes can enter into desirable or undesirable chemical reactions. For example, free fatty acids are desirable lubricants and flow promoters, but they react readily with basic parts of non-lubricating salts such as lead oxide. Important purely organic lubricants, such as fatty alcohols or partial esters of polyols, contain hydroxyl groups. Even these components are capable of reaction, that is, undesirable reaction, with free carboxyl groups.

As long as the individual compounds of such multicomponent mixtures are mixtures of solids, the danger of undesirable chemical reaction is practically nonexistent. However, the problems of possible component separation as well as the known undesirable flying dust of powdered, especially toxic, mixing components and particularly powdered lead salts, must be taken into consideration.

For the elimination of these last-mentioned disadvantages, the suggestion has been made to melt one or several of the individual components at elevated temperatures and to add the other solid components, especially the dusting inorganic salts of heavy metals, to this melt to homogenize the mixture and finally to granulate it (see GB-PS No. 1 136 935, U.S. Pat. No. 3,461,081, and DE-PS No. 17 94 429, incorporated herein by reference, for pertinent information). The melts of the stabilizers with lubricating effect and/or purely organic lubricants that were heated to the temperature range from about 120° to 130° C. function as liquid phase for this purpose. However, this type of mixing with or addition to the melted phase creates an almost ideal condition for the uncontrolled reaction of active components, and the composition of the total mixture is thus influenced by considerations unrelated to the stabilization problem.

OBJECTS OF THE INVENTION

It is an object of the invention to provide stabilizers and lubricants for halogenated polymers.

It is also an object of the invention to provide solid multicomponent mixtures of stabilizers and/or lubricants for halogenated polymers.

It is a further object of the invention to provide a method of preparing solid multicomponent mixtures of stabilizers and/or lubricants for halogenated polymers.

It is a yet further object of the invention to provide a process for the preparation of free-flowing stabilizer and/or lubricant combinations for halogenated polymers by combining a number of such lubricant and/or stabilizer components, wherein a mixture of powdered compounds, which consist at least partly of organic compounds and lubricants and/or stabilizers solid at room temperature, are intensively fluid-mixed together with small amounts of an organic lubricant for halogenated polymers that is liquid at room temperature.

These and other objects of the invention will become more apparent in the discussion below.

DETAILED DESCRIPTION OF THE INVENTION

The present invention is directed to combining practically any needed solid components of a stabilizer mixture of the type described below to form free-flowing granulates that are resistant to separation, without having to use intermediately formed melted phases for this purpose. The invention thereby is intended especially to provide the possibility of compounding stabilizer and/or lubricant components, which can react with each other in the liquid phase, in the solid state to give a separation-resistant combination, without the occurence of the inherently possible reactions to any substantial degree during this step and during subsequent storage. At the same time, the invention allows combination of dust-generating, possibly toxic, solids with preformed, solid, coarser dust-free stabilizers and/or lubricant components into separation-resistant, largely dust-free agglomerates, without the necessity of adding the powders to the melt of one or several components.

Consequently, the subject of the invention is, in a first embodiment, a process for the preparation of free-flowing stabilizer and/or lubricant combinations for halogenated polymers, especially PVC, by combining a number of such lubricant and/or stabilizer components. The new process is characterized by the fact that a mixture of powdered lubricants and/or stabilizers that are solids at room temperature and consist at least partly of organic compounds is intensively, i.e., intensely, fluid-mixed with small amounts of an organic lubricant for halogenated polymers that is liquid at room temperature.

It was surprisingly found that the cold compounding of the powdered solids components in question by intensive fluid-mixing, for example, in what is known as a fluid mixer, at room temperature can result in solid, granular and free-flowing granulates when very small amounts of a selected liquid phase are added. Thus the invention relates to, in an additional practical aspect, the use of small amounts of not easily volatilized lubricants for PVC processing that are liquid at room temperature for the compounding of a number of stabilizers and lubricants for PVC that are solids at room temperature, to form free-flowing, separation-resistant, and essentially dust-free agglomerates.

Finally, the invention relates to the free-flowing multicomponent mixtures prepared according to the process described from a number of powdered compounds, at least part of which are organic, and stabilizers and/or lubricants for halogenated polymers, especially PVC, that are solid at room temperature, these mixtures of substances being characterized by the fact that they contain in addition a small amount of at least one lubricant for halogenated polymers that is liquid at room temperature but is absorbed by the solid material and has especially permeated the solid organic mixing components by penetration.

Central to the invention is the observation that the addition of small amounts of selected liquid phases to an intensively fluid-mixed, powdered multicomponent system of the type concerned here allows, for a limited time span, cold granulation or cold compounding. Within this "open time," the intensively mechanically milled solid particles, which are therefore in constant contact, combine and stick together to form separation-resistant and generally dust-free granules that are stable in storage. However, scrupulous care must be taken to ensure that further softening of the mass—caused especially by an undesirable rise in temperature—does not occur. Otherwise, the desired free-flowing agglomerates of finest particles will no longer form, and the entire mass will stick together. This potential problem can be dependably eliminated by appropriate steps, especially by cooling of the batch during fluid-mixing.

It is preferred according to the invention that the lubricants which are liquid at room temperature and are not easily volatilized are components with boiling points that are sufficiently high that they show no, or almost no, volatilization during the forming treatment of the halogenated polymer mass. Consequently, each such component must be liquid in the temperature range of from approximately 20° to 25° C., and it should also be stable and non-volatile in the temperature range to at least approximately 230° C. (atmosperic pressure). Preferred for this purpose are liquid components that are compatible with the halogenated polymers, especially PVC, which are to be stabilized.

In an especially preferred embodiment of the invention, this liquid component is also compatible at room temperature with at least part of the organic solid components of the multi-component mixture subjected to fluid-mixing. The result is the development of the adhesion-promoting effect of the liquid component for a limited time in the area of the surface of the mixed solid particles, so that this liquid component is distributed by penetration into the interior of the organic solid particles during the course of the subsequent processing and/or the storage of the material. The effective time defines the "open time" of the multi-component mixture within which the desired particle agglomeration by mechanical application of force—initiated by the intensive fluid-mixing—and/or partial chemical reaction between potential reactants occurs.

Especially suitable liquid phases according to the invention include esters of higher carboxylic acids and/or higher alcohols that are liquid at room temperature, in which the alcohol component and/or the acid component have a branched structure. Higher alcohols with branched structure can be obtained, for example, by oxosynthesis. Examples of such alcohols include compounds such as isodecyl alcohol, isotridecyl alcohol, and/or isooctadecyl alcohol. Also useful are branched carboxylic acids corresponding to these alcohols as well as useful cuts of carboxylic acids with longer chains, for example, natural fatty acids or mixtures of fatty acids that belong mainly to the $C_{16-18}$ range. Esters of technical grade stearic acid with branched higher alcohols are examples of highly suitable liquid lubricants according to the invention.

Surprisingly, only very small amounts of this additive, which is liquid at room temperature, are needed for the formation of solid, free-flowing agglomerates from multicomponent mixtures of solids. This is also true when comparatively large amounts of dry, inorganic and/or organic salts of metals in finest particle form are incorporated. In such cases, the small amounts of liquid phase added according to the invention would be totally inadequate to moisten the dry material to such a degree that a substantial change in the aggregate condition would be achieved. However, under the conditions of intensive fluid-mixing and with the total mixing components present according to the invention, it can be seen that even these small amounts of liquid are sufficient to guarantee the desired object of compounding and agglomerating the solid particles.

The component which is liquid at room temperature is thus generally used in an amount of not more than 5 parts by weight, based upon a total of 100 parts by weight of the multicomponent mixture consisting of stabilizers and/or lubricants. Even very small amounts of the liquid phase, for example, about 0.2 or 0.3 parts by weight per 100 parts by weight of the multicomponent mixture, lead to considerable effects in the sense of the invention. The range from about 0.3 to 2 parts by weight of liquid phase, especially the range from approximately 0.4 to 1.3 parts by weight of liquid phase, based upon 100 parts by weight of the multicomponent mixture, is preferred.

Within the scope of the invention, the addition of at least part of the components of the stabilizer and/or lubricant mixture, which is solid at room temperature, as freeflowing pregranulate during the fluid-mixing step, is also preferred. The desired structure of the final product can be predetermined in this manner. The additional solid components added within the scope of the process according to the invention grow mainly on the surface of the preformed granulate grain and solidify there. This especially applies when the solid, pregranulated stabilizers and/or lubricant components are processed with solid stabilizers and/or lubricants of a smaller particles size, especially those which were not pregranulated. Even if several components of the stabilizer and/or lubricant mixture capable of mutual conversion due to their active groups are used simultaneously here, a reaction does not occur, or is very limited, in the process according to the invention. The active groups, which are protected by the solid aggregate state in the interior of each solid particle, are removed from reaction to start with, and the active groups present in the outer region are subject to the known, more stringent conditions of the conversion of solids, which are barely effected by the simultaneous use of the limited amounts of lubricant that is liquid at room temperature. There is a decisive deviation from the well-known processing of the components in the melt of at least one of the stabilizer and/or lubricant components.

Suitable preformed, comparatively coarser granulates especially include metallic soaps of higher carboxylic acids, which are preferably present in admixture with lubricants or flow promoters that are solid at room temperature. Typical examples of such metallic soaps are calcium, barium, strontium, magnesium, zinc, cadmium, or lead soaps of fatty acids with from 8 to 22 carbon atoms, among which calcium and/or zinc soaps, on the one hand, and corresponding compounds of lead, cadmium, and/or barium, on the other hand, are of special importance for practical application.

In an important, practical embodiment of the invention, pregranulates are produced first of non-toxic components that contain respective metallic soaps, especially zinc stearate and/or, above all, calcium stearate. These metallic soaps usually are present in this pregranulated component in admixture with solid lubricants or flow promoters. Examples of these include fatty acids, fatty acid esters, paraffins, wax esters, fatty alcohols, and/or partial esters of polyols or polycarboxylic acids as well as other purely organic substances that facilitate the granulation of the metallic soaps as flow promoters but which ultimately act as lubricants in the stabilized halogenated polymers.

According to a preferred embodiment of the preparation of these pregranulated components of the mixture, the metallic soaps are prepared in the melt of the organic components, and the mixture obtained by this method is then granulated by a well-known process. The invention makes use of the known fact that the manufacturing process for metallic soap, for example, from technical grade stearic acid and the respective metallic oxide or hydroxide in the melt, is facilitated as a matter of course and quite considerably (see, for example, Belgian Patent No. 481,219). The pregranulation can then also take place from this melt phase.

Preferably, this pregranulation is controlled in such a manner that at least the greater part of the solid granulate of metallic soap forming and, optionally, lubricant or flow promoter, has a particle size of from approximately 0.1 to 1 mm, especially from approximately 0.2 to 0.8 mm. When, for example, calcium stearate is to be formed as the metallic soap of this solid component and granulated, calcium hydroxide can be converted in a melt of stearic acid at a molar ratio of 1:2. The melt of calcium stearate formed is, however, viscous, so that the use of flow promoters with a diluent effect is preferred for the subsequent agglomeration. Especially well-known is the working in an excess of stearic acid, which may reach molar ratios of, for example, 15 mols of stearic acid to 1 mol of calcium hydroxide, or even higher. However, molar ratios of up to 10:1 or of only up to 5:1 are generally used. Inert, purely organic additives with a diluent effect, for example, paraffins, wax esters, dicarboxylates, polyesters, or similar compounds, are especially useful in addition to, or in place of, stearic acid. In this pregranulation step preceding the actual process according to the invention, it may be preferable not to use components desirable as such, if these are active compounds that, for example, together with an excess of free carboxylic acids, lead to undesirable reactions.

The granulation of their precursor is performed in the usual manner, for example, by spray-drying of the melt in a stream of hot gas, spraying on heated discs, or a similar process. The cooled, preformed granulate is then subjected to intensive fluid-mixing with the other solid components, under the influence of the small amounts of liquid lubricant.

Here, special attention must be given to the known non-lubricating, generally finely powdered stabilizers, which usually are metallic salts and, especially, salts of heavy metals. Lead salts without lubricating action are the most frequently used components for this purpose. Corresponding organic and/or inorganic compounds are definitely suitable, and inorganic salts of heavy metals, particularly inorganic lead salts, are the regularly used stabilizers without lubricating action.

In a preferred aspect of the invention, mixture components that do not generate too much dust, although they are in powdered form, are chosen. Characteristic examples include inorganic basic lead salts, especially the tribasic lead sulfate or the dibasic lead phosphite. In addition, sulfates and/or phosphites, carbonates, phosphates, titanates, or also organic acid salts, especially of cadmium, barium, calcium, magnesium, and particularly lead, are generally suitable as this component. Basic salts containing an amount of metallic oxide in addition to the metallic salt component are especially preferred.

This non-lubricating stabilizer component usually has smaller particles than the pregranulate of stabilizers with lubricant effect and/or the purely organic lubricants preferred for use according to the invention. Under the influence of the small amount of liquid component added according to the invention and of the mechanical effect due to intensive fluid-mixing, the finely granulated material grows on the preformed granulate grains and remains there, essentially anchored by adhesion, even when the liquid component migrates gradually over a period of time by penetrating the interior of solid, organic particles.

In this step, the concomitant use of organic solid components, which support the formation of sufficiently tightly adhering coatings on the pregranulated material, may be desirable to control or facilitate this coating of the granulate with finely powdered components of the stabilizer mixture according to the invention. These substances are, according to the invention, in particular solid, purely organic lubricant components that are desirable in any event as an integrating component of the total mixture. These lubricants, which may be used concomitantly, if needed, can be added as powder or, optionally, in pregranulated form. Consequently, in a preferred embodiment of the invention, the following solid components are added in the intensive fluid-mixing step:

(a) a preformed, relatively coarse granulate of metallic soaps of higher alkanoic acids and preferably additional solid lubricants or flow promoters such as fatty acids, esters of fatty acids, paraffins, wax esters, fatty alcohols, and/or partial esters of polyols or polycarboxylic acids, in admixture with (b) organic and/or inorganic metallic salts with stabilizer action for PVC and having a finer granulate structure than granulate (a), especially corresponding inorganic salts of heavy metals being used for this purpose, optionally also in admixture with (c) powdered or pregranulated solid, organic lubricants such as fatty acids, esters of fatty acids, paraffins, wax esters, fatty alcohols, and/or partial esters of polyols or polycarboxylic acids.

In another embodiment of the invention, such a mixture of solids is subjected to intensive fluid-mixing in the cold, that is, at room temperature or only insignificantly rising temperatures, and the liquid component is then metered into the mixed material. This method ensures essentially uniform mixing of the small amounts of liquid with the dry mixture and their homogeneous distribution in the dry mixture by a simple step.

The mixing process is then continued until the desired formation of the largely dust-free, free-flowing granulate is complete. A period of generally not more than approximately thirty minutes is needed for this step; however, dependent upon the compounding, the desired objective may be reached with as few as one or two minutes of fluid-mixing. The usual mixtures of solids concerned here granulate satisfactorily within from about two to twenty minutes under the conditions according to the invention.

It is important during this step to prevent melting, or even softening, of the powdered organic components that are solid at room temperature. The possible formation of an undesirable heat of reaction due to the intensive mechanical effect on the batch must be kept in mind and sufficiently prevented. To this end, the batch subjected to fluid-mixing can be cooled and/or the intensity of the process of fluid-mixing can be reduced, for example, as soon as undesirable temperature effects are observed. For example, the process according to the invention can be monitored by continuous measuring of the batch temperature and/or continuous determination of the load on the moving element for the fluid-mixing. The undesirable softening of solid particles in the fluid-mixed batch due to uncontrolled temperature increases manifests itself immediately in a lowered fluidity or in an increase in the viscosity of the circulating stream of fine solid particles, which can be observed indirectly by an increase of the load takeup, for example, at the agitator of the treatment tank. Concomitant use of cooling for the fluid-mixed batch and the monitoring of the load capacity, and thus control of the fluid-mixing rate, can be especially advantageous.

In a further preferred embodiment of the invention, undesirable melting or softening of the solid particles is prevented by the additional step of providing an adequate margin between the operating temperature and the melting point, especially with regard to organic solid components. For example, it may be advisable to have a temperature span of at least 25° C., especially at least 30° C., between operating temperature and melting point of the lowest-melting solid components. Greater temperature spans are preferred. Preferably, for example, a preformed granulate of stabilizers with lubricating action and, if necessary, solid flow promoters or lubricants, which has a melting point above about 90° C., preferably above about 95° C., is used. In this case, the operating temperatures for the phase of intensive fluid-mixing are not above about 40° C., preferably below about 35° C., and are maintained in the range from approximately 25° to 30° C.

The range of possible reactions of the active mixing components is limited under the conditions of the process according to the invention. Slow reactions, for example, esterification and/or re-esterification, are excluded for practical purposes. Ionic reactions, for example, the formation of lead salts of stearic acid from free stearic acid and the lead oxide content of basic lead salts, take place to a limited extent only. The formation of lead stearate, which is especially dusty, can be kept to a minimum by this method. The small amounts of lead stearate formed are worked into the agglomerate and made to adhere.

The mixing proportions of purely organic lubricants or flow promoters, stabilizers with lubricating action, and non-lubricating stabilizers correspond to the formulations generally used for this purpose. Preferably from approximately 20 to 70 parts by weight, especially from approximately 25 to 55 parts by weight, of the powdered, non-lubricating stabilizer component, mixed with the lubricating stabilizers and/or purely organic lubricants, are present per 100 parts by weight of the multicomponent mixture. The process according to the invention is particularly suitable for the preparation of granulated partial mixtures intended for mixture with additional portions of stabilizers and/or lubricants. Solid components containing pregranulated stabilizers with lubricating action can be used together with purely organic lubricants, for example, in quantitative ratios (parts by weight) of from approximately 10:1 to 100:1. These purley organic lubricants, preferably selected from the group consisting of fatty acids, esters of fatty acids, paraffins, wax esters, fatty alcohols, and/or partial esters of polyols or polycarboxylic acids, can be used in powder form. However, these components may also be pregranulated and this pregranulate may be mixed in the intensive fluid-mixing phase, according to the invention.

The process according to the invention can be advantageously carried out in so-called fluid mixers marketed now by various companies. Usually a cooled tank with agitator, which has an agitator element located at the bottom that guarantees the intensive circulation of the powdered solids during the agglomeration phase, is provided. The peripheral velocities of the agitator element are preferably in the range from approximately 24 to 36 m/second. Suitable speed can be determined, on the one hand, by controlling the temperature of the batch or the load on the agitator element, in synchronism with the desired agglomeration effect. The process according to the invention can be operated discontinuously or continuously. In the continuous process, the work is preferably carried out with a mixing cascade that allows a discontinuous or also continuous metering of the solids and/or the liquid portion.

The following examples are intended to illustrate the invention and should not be construed as limiting the invention thereto.

EXAMPLES

EXAMPLE 1

(a) Preparation of the Pregranulate

A reactor with heat and vacuum, to which an inline Turax mixer was attached, was charged with 2110 kg of stearic acid and 1854 kg of glyceryl stearate. The contents were melted by heating to 160° C. The melt was stirred with the Turax mixer, and 299 kg of hydrate of white lime were added in portions and as quickly as the water vapor developing due to the reaction permitted. When all the lime had been added, the reactor was closed and evacuated to 40 mbar over four hours. The melt was kept at approximately 160° C. during the entire time and was stirred with the Turax mixer. Then, the melt was cooled to 140° C., the reactor was opened, and 396 kg of lauric acid were added. As soon as the lauric acid was dissolved, the melt was transferred by pump into spray equipment and granulated in a spray tower with a fluidized bed at 130° to 140° C. The product obtained has a fusion point of 98° C., and the acid number was 32.

(b) Preparation of the Stabilizer Lubricant Mixture.

A fluid mixer (Papenmeier TS; 150 liters) was charged with 48.5 kg of basic lead sulfate and 30.7 kg of the pregranulate from step (a) above. After the fluid mixer, which was cooled with cold water (10° C.), was started, 0.6 kg of isotridecyl stearate was added. The batch material was intensively fluid-mixed for four and one-half minutes, and the driving motor's current consumption reached 100 amperes toward the end. A fine-grain, almost completely dust-free product with an apparent density of 1.2 gm/ml was obtained.

EXAMPLE 2

(a) Preparation of the Pregranulate

The reactor described in Example 1 was charged with 4400 kg of stearic acid and 1250 kg of solid paraffin (softening point: 116° C.; solidification point: 98° C.). The batch materials were melted by heating to 160° C. Then, the inline Turax mixer was started, and 202 kg of hydrate of white lime were added in portions. When the addition of lime was complete, the reactor was closed and evacuated to 40 mbar over a period of three hours. During this time, the melt was maintained at approximately 160° C. and was stirred. Then, the melt was cooled to 140° C., the reactor was opened, and 250 kg of bisphenol A were added, with mixing. When the bisphenol A was dissolved, the melt was transferred to spray equipment and sprayed in a spray tower with fluidized bed at 130° C. The product obtained had a fusion point of 103° C.; the acid number was 104.

(b) Preparation of the Stabilizer Lubricant Mixture

The fluid mixer described in Example 1 was charged with 30.4 kg of basic lead sulfate, 40.5 kg of the pregranulate from step (a) above, and 8.4 kg of pentaerythritol stearate. When the fluid mixer, which was cooled with cold water (10° C.), was started, 0.7 kg of isononyl stearate was added. The batch material was intensively fluid-mixed for a total of two minutes, and the driving motor's current consumption reached 100 amperes toward the end. A fine-grain, almost completely dust-free product with an apparent density of 0.81 gm/ml was obtained.

EXAMPLE 3

(a) Preparation of the Pregranulate

The reactor described in Example 1 was charged with 5500 kg of stearic acid. The acid was melted by heating to 160° C. While the melt was stirred with the Turax mixer, 300 kg of hydrate of white lime were added in portions. Then, the reactor was closed and evacuated to 40 mbar over a period of three and one-half hours. The melt was maintained at approximately 160° C. during this time and was stirred with the Turax mixer. Then, the melt was cooled to 140° C., the reactor was opened, and 360 kg of bisphenol A were added. When the bisphenol A had dissolved, the melt was granulated in a spray tower with fluidized bed at 130° C. The product obtained had a fusion point of 84° C.; the acid number was 115.

(b) Preparation of the Stabilizer Lubricant Mixture

The fluid mixer described in Example 1 was charged with 8.2 kg of tribasic lead sulfate, 39.7 kg of lead phosphite, 18.2 kg of the pregranulate from step (a) above, and 13.2 kg of pentaerythritol stearate. When the mixer, which was cooled with cold water (10° C.), was started, 0.7 kg of 2-ethylhexyl stearate was added. The batch material was intensively fluid-mixed for a total of 15 minutes, and the driving motor's current consumption reached 100 amperes at the end. A fine-grain, almost dust-free product with an apparent density of 1.1 gm/ml was obtained.

EXAMPLE 4

A pregranulate prepared analogously to step (a) of Example 1 (25% by weight of calcium stearate, 50% by weight of stearic acid, and approximately 21% by weight of solid paraffin with a softening point of 116° C. and a solidification point of 98° C.) was used for the preparation of a stabilizer lubricant mixture. A fluid mixer (Papenmeier HK 35; 35 liters) was charged with 9.6 kg of the pregranulate, 7.2 kg of tribasic lead sulfate, and 2 kg of pentaerythritol stearate. When the fluid mixer, which was cooled with cold water, was started, 0.16 kg of isotridecyl stearate was added. The batch material was intensively fluid-mixed for 2 minutes and 14 seconds at a speed of 750 rpm, and the driving motor's current consumption reached 20 amperes at the end. A fine-grain, almost dust-free product with an apparent density of 0.74 gm/ml was obtained.

EXAMPLE 5

The procedure described above was repeated with the exception that the isotridecyl stearate was replaced by the same weight of liquid paraffin (boiling range: 276° to 399° C.). A fine-grain, almost dust-free product with an apparent density of 0.78 gm/ml was obtained in this case.

COMPARATIVE EXAMPLE A

The procedure of Example 4 was repeated with the exception that no lubricant liquid at room temperature was added. The product obtained after the stipulated time was intimately mixed, but it was still strongly dust-generating and non-compacting.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for preparing free-flowing stabilizer and lubricant compositions for halogenated polymers, said compositions comprising:
   (a) powdered stabilizer;
   (b) powdered lubricant; and
   (c) organic lubricant for halogenated polymers that is liquid at room temperature, at least one of components (a) and (b) being an organic compound and components (a) and (b) being solid at room temperature, wherein a mixture of components (a) and (b) is intensely fluid-mixed together with from about 0.2 to 5 parts by weight, per 100 parts by weight of said mixture, of component (c), the process being carried out so that melting or softening of components (a) and (b) does not occur.

2. The process of claim 1, wherein said mixture also comprises additional powdered lubricant or flow promoters.

3. The process of claim 1, wherein said mixture also comprises pigment, filler, or both pigment and filler.

4. A process for preparing free-flowing stabilizer and lubricant compositions for halogenated polymers comprising combining two or more lubricant and stabilizer components to form a mixture of powdered compounds, which mixture consists at least partly of organic compounds and which lubricants and stabilizers are solid at room temperature, and intensely fluid-mixing said mixture together with from about 0.2 to 5 parts by weight, per 100 parts by weight of the mixture, of an organic lubricant for halogenated polymers that is liquid at room temperature, the process being carried out so that melting or softening of the powdered compounds does not occur.

5. The process of claim 4, wherein the halogenated polymer is PVC.

6. The process of claim 4, wherein the materials being intensely fluid-mixed together are cooled.

7. The process of claim 4, wherein the organic lubricant liquid at room temperature is absorbed by at least one of the powdered components that are solid at room temperature.

8. The process of claim 4, wherein at least part of the components that are solid at room temperature are added to the fluid-mixing step in the form of a free-flowing pregranulate.

9. The process of claim 4, wherein solid, pregranulated stabilizers and lubricants for halogenated polymers mixed wth solid stabilizers and lubricants of smaller particle size are intensely fluid-mixed together with the organic lubricant liquid at room temperature.

10. The process of claim 9, wherein the solid stabilizers and lubricants of smaller particle size were not pregranulated.

11. The process of claim 4, wherein the organic lubricant liquid at room temperature is stable and nonvolatile in the temperature range to at least approximately 230° C.

12. The process of claim 11, wherein the organic lubricant liquid at room temperature is selected from the group consisting of the 2-ethylhexyl, isononyl, isodecyl, isotridecyl, and isooctadecyl esters of 2-ethylhexanoic, isononanoic, isodecanoic, isotridecanoic, or isooctadecanoic acid or of a fatty acid having from 16 to 18 carbon atoms or a mixture thereof.

13. The process of claim 12, wherein the organic lubricant liquid at room temperature is selected from the group consisting of said esters of stearic acid.

14. The process of claim 1, wherein
(a) is preformed, relatively coarse granulate or metallic soaps of higher carboxylic acids mixed with
(b) organic and/or inorganic metallic salts with stabilizer action for halogenated polymers and particle size smaller than that of component (a), optionally in admixture with
(c) powdered or pregranulated, solid organic lubricants,
is used as the mixture of powdered compounds.

15. The process of claim 14, wherein component (a) also comprises additional solid lubricants or flow promoters.

16. The process of claim 15, wherein the additional solid lubricants or flow promoters comprise one or more members selected from the group consisting of fatty acids, esters of fatty acids, paraffins, wax esters, fatty alcohols, and partial esters of polyols and polycarboxylic acids.

17. The process of claim 14, wherein component (b) comprises inorganic salts of metals selected from the group consisting of lead, cadmium, barium, calcium, and magnesium.

18. The process of claim 14, wherein component (c) comprises one or more members selected from the group consisting of fatty acids, paraffins, wax esters, fatty alcohols, and partial esters of polyols and polycarboxylic acids.

19. The process of claim 14, wherein component (b) comprises substantially dust-free salts of metals selected from the group consisting of lead, cadmium, barium, calcium, and magnesium.

20. The process of claim 19, wherein component (b) comprises tribasic lead sulfate and/or dibasic lead phosphite.

21. The process of claim 14, wherein pregranulated component (a) and/or component (c) comprise free, higher carboxylic acids and these higher carboxylic acids are partially converted at the granulate surface into the corresponding soaps of said metals by reaction with basic salts of said metals.

22. The process of claim 21, wherein pregranulated component (a) and/or component (c) comprise fatty acids.

23. The process of claim 14, wherein component (a) has a particle size of from about 0.1 to 1 mm.

24. The process of claim 14, wherein component (c) is a pregranulate.

25. The process of claim 24, wherein component (c) has a particle size of from about 0.1 to 1 mm.

26. The process of claim 14, wherein from about 20 to 70 parts by weight of component (b) and from about 30 to 80 parts by weight of component (a) or, optionally, components (a) and (c), are used per 100 parts by weight of the multi-component mixture.

27. The process of claim 26, wherein from about 25 to 55 parts by weight of component (b) and from about 45 to 75 parts by weight of component (a) or, optionally, components (a) and (c), are used per 100 parts by weight of the multi-component mixture.

28. The process of claim 14, wherein component (a) and component (c) are used in a weight ratio of from about 10:1 to 100:1.

29. The process of claim 14, wherein component (a) has a melting point above 90° C. and the mixing takes place at a temperature below 40° C.

30. The process of claim 29, wherein component (a) has a melting point above 95° C.

31. The process of claim 29, wherein the mixing takes place at a temperature below 35° C.

32. The process of claim 14, wherein the component liquid at room temperature is fed into a charged and dry fluid-mixed mixture of components (a), (b), and, optionally, (c).

33. The process of claim 4, wherein from about 0.3 to 2 parts by weight of the organic lubricant liquid at room temperature are used per 100 parts by weight of the multicomponent stabilizer and lubricant mixture.

34. The process of claim 4, wherein the mixture is fluid-mixed with the organic lubricant for from about 2 to 20 minutes.

35. The process of claim 34, wherein the mixture is fluid-mixed with the organic lubricant for from about 5 to 20 minutes.

36. A process of claim 4 for preparing free-flowing stabilizer and lubricant compositions for halogenated polymers comprising combining two or more lubricant and stabilizer components to form a mixture of powdered compounds, which mixture consists at least partly of organic compounds and which lubricants and stabilizers are solid at room temperature, and intensely fluid-mixing said mixture together at a temperature below 40° C. with from about 0.2 to 5 parts by weight, per 100 parts by weight of the mixture, of an organic lubricant for halogenated polymers that is liquid at room temperature and is stable and non-volatile in the temperature range to at least approximately 230° C.

37. A process of claim 4 for preparing free-flowing stabilizer and lubricant compositions for halogenated polymers by combining two or more lubricant and stabilizer components wherein a mixture of:
   (a) a preformed, relatively coarse granulate of metallic soaps of higher carboxylic acids mixed with
   (b) organic and/or inorganic metallic salts with stabilizer action for halogenated polymers and particle size smaller than that of component (a), optionally in admixture with
   (c) powdered or pregranulated, solid organic lubricants, is intensely fluid-mixed together at a temperature below 40° C. with from about 0.2 to 5 parts by weights, per 100 parts by weight of the mixture, of an organic lubricant for halogenated polymers that is liquid at room temperature and is stable and non-volatile in the temperature range to at least approximately 230° C.

* * * * *

UNITED STATES PATENT AND TRADEMARK OFFICE
CERTIFICATE OF CORRECTION

PATENT NO. : 4,591,452
DATED : May 27, 1986
INVENTOR(S) : KURT WORSCHECH et al.

It is certified that error appears in the above-identified patent and that said Letters Patent is hereby corrected as shown below:

Column 11, Claim 14, line 2, "is" should read -- a -- and "or" should read -- of --.

Signed and Sealed this

Twenty-third Day of September 1986

[SEAL]

*Attest:*

DONALD J. QUIGG

*Attesting Officer*  *Commissioner of Patents and Trademarks*